(12) United States Patent
Marugami (10) Patent No.: US 8,565,471 B2
(45) Date of Patent: *Oct. 22, 2013

(54) SPEAKER UNIT AND PORTABLE INFORMATION TERMINAL

(75) Inventor: Takashi Marugami, Ibaraki (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 55 days.

This patent is subject to a terminal disclaimer.

(21) Appl. No.: 13/142,077

(22) PCT Filed: Nov. 11, 2009

(86) PCT No.: PCT/JP2009/069206
§ 371 (c)(1),
(2), (4) Date: Jun. 24, 2011

(87) PCT Pub. No.: WO2010/073840
PCT Pub. Date: Jul. 1, 2010

(65) Prior Publication Data
US 2011/0255733 A1 Oct. 20, 2011

(30) Foreign Application Priority Data
Dec. 25, 2008 (JP) .................................. 2008-331418

(51) Int. Cl.
*H04R 25/00* (2006.01)
(52) U.S. Cl.
USPC ............................ 381/420; 381/398; 381/408
(58) Field of Classification Search
USPC .................. 381/396, 399, 408, 421–422, 431
See application file for complete search history.

(56) References Cited

U.S. PATENT DOCUMENTS

| 4,281,223 | A  | * | 7/1981  | Ugaji et al. ................... | 381/408 |
| 6,973,194 | B2 | * | 12/2005 | Iwasa et al. ................... | 381/412 |
| 7,116,796 | B1 | * | 10/2006 | Reenberg ...................... | 381/431 |
| 7,388,964 | B2 | * | 6/2008  | Tomoeda et al. ............. | 381/412 |
| 7,412,065 | B2 | * | 8/2008  | Nguyen et al. ................ | 381/152 |
| 7,912,239 | B2 | * | 3/2011  | Nishimura et al. ........... | 381/396 |
| 8,094,864 | B2 | * | 1/2012  | Inaba et al. ................... | 381/398 |

FOREIGN PATENT DOCUMENTS

| JP | 3213521 B2     | 10/2001 |
| JP | 2004-072647 A  | 3/2004  |
| JP | 2004-128822 A  | 4/2004  |
| JP | 2008-177860 A  | 7/2008  |
| WO | 2006-137130 A1 | 12/2006 |

OTHER PUBLICATIONS

International Search Report for PCT/JP2009/069206, mailing date of Mar. 30, 2010.

* cited by examiner

*Primary Examiner* — Mohammad Islam
*Assistant Examiner* — Phylesha Dabney
(74) *Attorney, Agent, or Firm* — Westerman, Hattori, Daniels & Adrian, LLP (57) ABSTRACT

A speaker unit and a portable information terminal that are reduced in size and thickness and still produce a high sound pressure. A speaker unit includes: a yoke having a rectangular outline as seen in a plan view; a magnet member placed on the yoke and magnetized so that an upper surface of the magnet member has an N pole and an S pole aligned in one direction; a coil placed above and spaced from the upper surface of the magnet member; a diaphragm attached to the coil; and a frame supporting the diaphragm. The yoke includes an attachment which protrudes upward from an outer periphery of the yoke for attachment to the frame. The attachment has a recess at least in a central portion of the attachment which crosses the one direction.

6 Claims, 7 Drawing Sheets

SPEAKER UNIT AND PORTABLE INFORMATION TERMINAL

TECHNICAL FIELD

The present invention relates to a speaker unit and a portable information terminal, and particularly relates to a speaker unit and a portable information terminal that are reduced in size and thickness.

BACKGROUND ART

Speaker units are used in portable information terminals such as mobile phone, DSC (Digital Still Camera), PDA (Personal Digital Assistant), and PC (Personal Computer). A speaker unit herein includes a so-called speaker and a receiver.

An electroacoustic transducer (speaker unit) has been proposed that has a flat-shaped coil (horizontal coil) wound in such a manner that the number of coil layers in the width direction is larger than the number of coil layers in the thickness direction so as to reduce the size and the thickness (see for example Japanese Patent No. 3213521: Patent Document 1).

Patent Document 1: Japanese Patent No. 3213521

DISCLOSURE OF THE INVENTION

Problems to be Solved by the Invention

Recently, portable information terminals such as mobile phone, DSC (Digital Still Camera), PDA (Personal Digital Assistant), and PC (Personal Computer) have been reduced rapidly in size and thickness. Accordingly, the space occupied by the speaker unit used in the portable information terminal continues being reduced. There is thus an increasing need for use of a speaker unit which occupies a smaller space and exhibits higher performance. Particularly, because of a large influence of a reduced sound pressure resultant from the reduced size and thickness, expectations are rising for a speaker unit and a portable information terminal that are structured to have a smaller size and a smaller thickness and still exhibit high sound pressure performance.

Regarding the above-described horizontal coil, it is necessary, for raising the sound pressure, to pass many magnetic fluxes through the coil which is located above a magnet member. In order to achieve this, the upper surface of the magnet member may have N and S poles arranged to generate loops of magnetic fluxes along respective paths connecting an upper surface section and another upper surface section of the magnet member, and increase the number of magnetic fluxes above the magnet member.

Meanwhile, in order to prevent magnetic flux leakage from the magnet member to the outside of the device, the bottom of the magnet member may be covered with a yoke. In the case where the yoke is provided, however, it is necessary to attach the yoke to a frame and it is also necessary to provide the yoke with an attachment for attaching the yoke to the frame.

As such an attachment, if an attachment in the shape of a protrusion is provided to the yoke, this attachment directs and increases magnetic flux loops along respective paths connecting the upper surface and the lower surface of the magnet member. On the contrary, the magnetic flux loops along respective paths connecting an upper surface section and another upper surface section of the magnet member decreases, resulting in a decrease in the number of magnetic fluxes passing through the coil. As a result, a magnetic efficiency loss occurs and the sound pressure decreases.

The present invention has been made in view of the problems above, and an object of the invention is to provide a speaker unit and a portable information terminal that are reduced in size and thickness and still produce a high sound pressure.

Means for Solving the Problems

A speaker unit of the present invention includes: a yoke which has a rectangular outline as seen in a plan view; a magnet member which is placed on the yoke and magnetized so that an upper surface of the magnet member has an N pole and an S pole aligned in one direction; a coil which is placed above and spaced from the upper surface of the magnet member; a diaphragm which is attached to the coil; and a frame which supports the diaphragm. The yoke includes an attachment which protrudes upward from an outer periphery of the yoke for attachment to the frame. The attachment has a recess at least in a central portion of the attachment which crosses the one direction.

In the speaker unit of the present invention, no magnetic flux is directed through the recess of the yoke to the upper surface of the magnet member. Therefore, in a region of the magnet member that is adjacent to the recess, the number of magnetic fluxes on the upper surface of the magnet member can be increased. In this way, the number of magnetic fluxes passing through the coil can be increased and therefore the sound pressure can be improved.

Preferably, in the above-described speaker unit, the attachment has a recess in a portion except for opposite end portions of the attachment crossing the one direction.

With this attachment, the yoke can be joined to the frame, and the strength of junction between the yoke and the frame can be improved.

Preferably, in the above-described speaker unit, the magnet member is made up of a plurality of magnetic bodies including a first magnetic body having an upper surface magnetized to an N pole and a second magnetic body having an upper surface magnetized to an S pole.

In this way, horizontal components of the high-density magnetic fluxes on the upper surface of the magnet body can be used to drive the horizontal coil. Preferably, in the above-described speaker unit, the magnet member is formed of a single magnetic body with an upper surface having an N pole and an S pole.

In this way, the number of components can be reduced, which enables reduction in production cost and improvement in productivity including the production time for example.

Preferably, in the above-described speaker unit, the coil is one of a rectangle coil, an elliptical coil, a running-track-shaped coil, and a polygonal coil.

The degree of freedom in design can thus be improved.

A portable information terminal of the present invention includes any speaker unit as described above.

The portable information terminal of the present invention includes any speaker unit as described above, and therefore, the size and thickness of the portable information terminal can be reduced and the sound pressure such as voice and ringtone can be improved.

Effects of the Invention

As seen from the foregoing description, the speaker unit and the portable information terminal of the present invention enable reduction in size and thickness as well as increase in sound pressure.

BEST MODES FOR CARRYING OUT THE INVENTION

Embodiments of the present invention will hereinafter be described with reference to the drawings.

First Embodiment

First, a configuration of a speaker unit in the present embodiment will be described.

Figure 1:
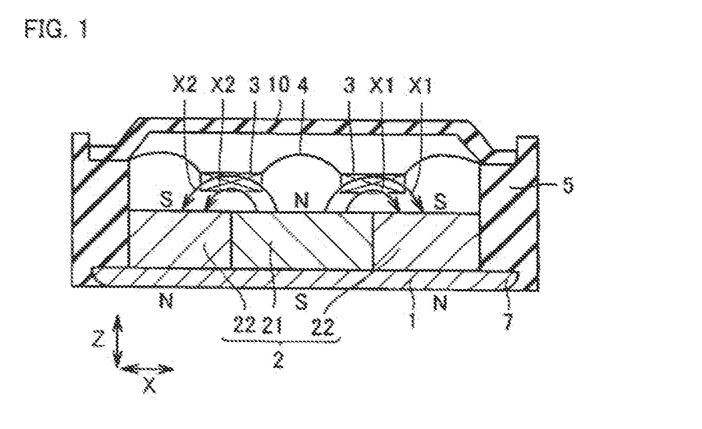
FIG. 1 is a schematic cross section of a speaker unit in a first embodiment.
Figure 2:
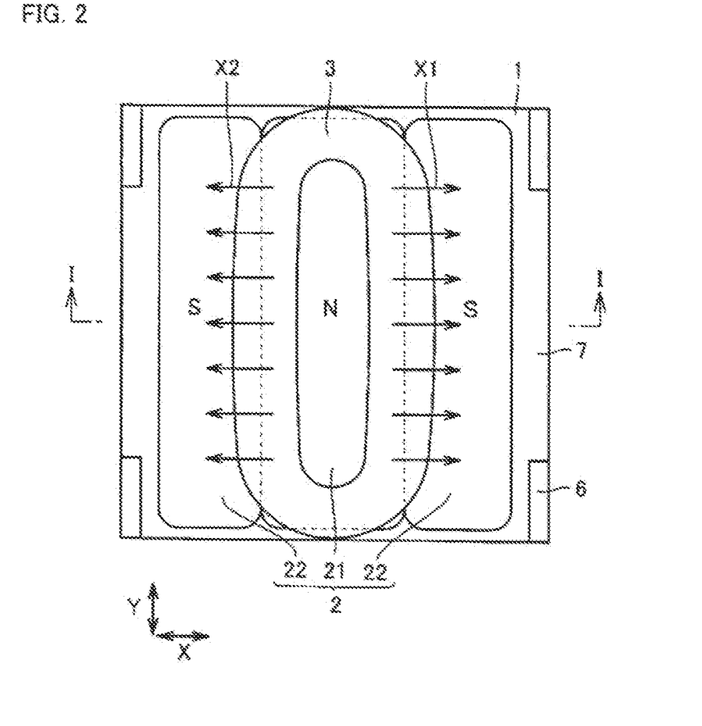
FIG. 2 is a schematic plan view of the speaker unit in the first embodiment.

FIG. 1 is a schematic cross section showing the configuration of the speaker unit in the first embodiment of the present invention. FIG. 2 is a schematic plan view of the speaker unit shown in FIG. 1. FIG. 2 does not show a diaphragm and a frame cover for the sake of facilitating visual perception. A schematic cross section along a line I-I in FIG. 2 is shown in FIG. 1.

Referring to FIGS. 1 and 2, the speaker unit of the present embodiment mainly includes a yoke 1, a magnet member 2, a coil 3, a diaphragm 4, a frame 5, a frame cover 10, and an attachment 6. Yoke 1 as shown in FIG. 2 has a rectangular outline as seen in a plan view. Magnet member 2 is placed on and in contact with yoke 1. Magnet member 2 is magnetized so that an upper surface has an S pole, an N pole, and an S pole that are aligned in this order along the X direction (one direction) in the drawings, and a lower surface has an N pole, an S pole, and an N pole aligned in this order along the X direction.

Magnet member 2 has for example a plurality of magnetic bodies 21, 22. By way of example, a central portion 21 (first magnetic body) of magnet member 2 is formed of a magnet magnetized so that the upper surface is an N pole and the lower surface is an S pole. On the contrary, opposite end portions 22 (second magnetic bodies) of magnet member 2 are each formed of a magnet magnetized so that the upper surface is an S pole and the lower surface is an N pole. Magnet member 2 is placed in such a manner that allows the outer sides of opposite end portions 22 of magnet member 2 to contact the inner sides of frame 5.

Coil 3 is placed above and spaced from the upper surface of magnet member 2. This coil 3 is a flat-shaped coil (horizontal coil) in that the number of coil layers in the width direction (X or Y direction in FIGS. 1 and 2) is larger than that in the thickness direction (Z direction in FIG. 1). Coil 3 is placed so that a magnetic flux produced by magnet member 2 passes across coil 3.

The linear portions of the contour of coil 3 as seen in a plan view are located above the boundaries between central portion 21 and opposite end portions 22 of magnet member 2. In the case of the horizontal coil, the magnetic flux in the direction along the upper surface of magnet member 2 drives coil 3. The density of magnetic fluxes in the direction along the upper surface of magnet member 2 is at its maximum on the boundaries between central portion 21 and opposite end portions 22 of magnet member 2. Thus, the linear portions of coil 3 can be arranged above the boundaries between central portion 21 and opposite end portions 22 of magnet member 2 to drive coil 3 with the maximum magnetic flux density.

A magnetic circuit is formed by the above-described yoke 1, magnet member 2, and coil 3. Magnetic fluxes X1, X2 are directed from the N pole of the upper surface of central portion 21 of magnet member 2 to the S poles of respective upper surfaces of opposite end portions 22, so that the magnetic fluxes pass through coil 3 above the upper surface of magnet member 2.

Diaphragm 4 has a lower surface to which coil 3 is attached. Diaphragm 4 is formed of a thin plate so that it can vibrate in the up and down direction (Z direction). Diaphragm 4 is made for example of a synthetic resin. The outer periphery of this diaphragm 4 is supported by frame 5.

Figure 3:
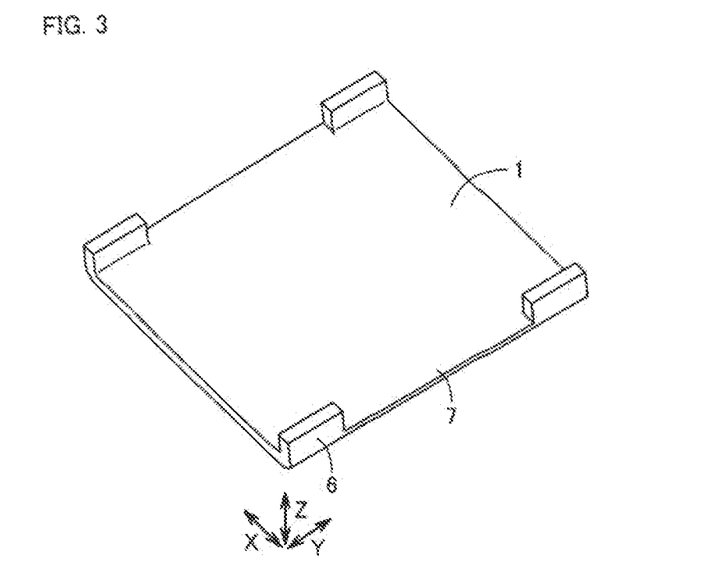
FIG. 3 is a schematic perspective view of a yoke of the speaker unit in the first embodiment.
Figure 4:
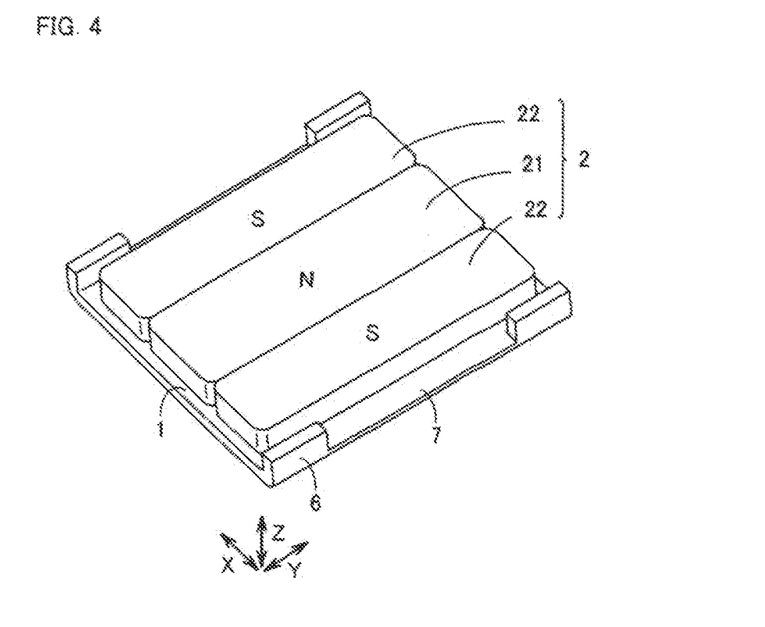
FIG. 4 is a schematic perspective view of the yoke and a magnet member of the speaker unit in the first embodiment.

FIG. 3 is a schematic perspective view of the yoke in the present embodiment. FIG. 4 is a schematic perspective view of the yoke and the magnet member in the present embodiment. Referring to FIGS. 3 and 4, yoke 1 has attachment 6 on the side along the direction (Y direction) which crosses the direction along which the S pole, the N pole, and the S pole of the upper surface of magnet member 2 are aligned. This attachment 6 is a part supported by frame 5 when yoke 1 is attached to frame 5, and stands from the side of yoke 1 in the upward direction (Z direction) as seen in the drawings. Further, in a central portion of attachment 6, a recess 7 is formed. This central portion of attachment 6 is an intermediate portion along the longitudinal direction of attachment 6.

Figure 5:
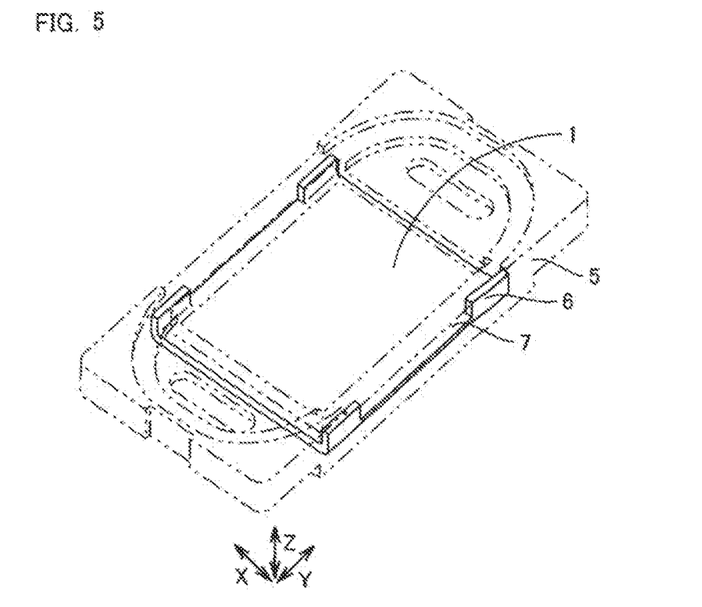
FIG. 5 is a schematic perspective view of the yoke and a frame of the speaker unit in the first embodiment.

FIG. 5 is a schematic perspective view of the yoke and the frame in the present embodiment. Referring to FIG. 5, the upper surface of the outer peripheral portion of yoke 1 is covered with frame 5. Further, the whole surface of attachment 6 of yoke 1 is fit in frame 6 and the whole surface of attachment 6 is supported by frame 5 to thereby connect yoke 1 to frame 5.

Yoke 1 and frame 5 are assembled for example by insert molding. Specifically, assembly is performed by injecting a resin into a mold in which yoke 1 is held so that frame 5 is made of the resin. Consequently, frame 5 is molded to allow the resin to surround the outer end faces of yoke 1 and attachment 6. Molded frame 5 is also located inside attachment 6 of yoke 1.

Frame cover 10 is placed to cover diaphragm 4. Frame cover 10 is formed toward the upper surface in the shape of a trapezoid having one pair of parallel sides. Frame cover 10 is attached to frame 5 with diaphragm 4 interposed therebetween, so that the upper surface of the outer periphery of diaphragm 4 is opposite to the lower surface of the outer periphery of frame cover 10. No frame cover 10 may be provided so that diaphragm 4 is not covered.

The speaker unit of the present embodiment is configured in the above-described manner.

While the foregoing description is given of magnet member 2 having magnets that are arranged as central portion 21 and opposite end portions 22 of magnet member 2, magnet member 2 may be the one having a ferromagnetic body (first magnetic body) as central portion 21 and magnets arranged as opposite end portions 22 on the opposite sides of this ferromagnetic body (first magnetic body). The magnets (second magnetic bodies) located on the opposite sides of the ferromagnetic body (first magnetic body) each may be formed of a magnet magnetized so that the upper surface is an S pole and the lower surface is an N pole.

Further, the positional relation between the first magnetic body and the second magnetic body may be opposite to that in the above-described configuration. Specifically, central portion 21 of magnet member 2 may be the second magnetic body with the polarity that the upper surface is an S pole and the lower surface is an N pole, and the opposite end portions 22 may be first magnetic bodies each having the polarity that the upper surface is an N pole and the lower surface is an S pole.

Figure 6:
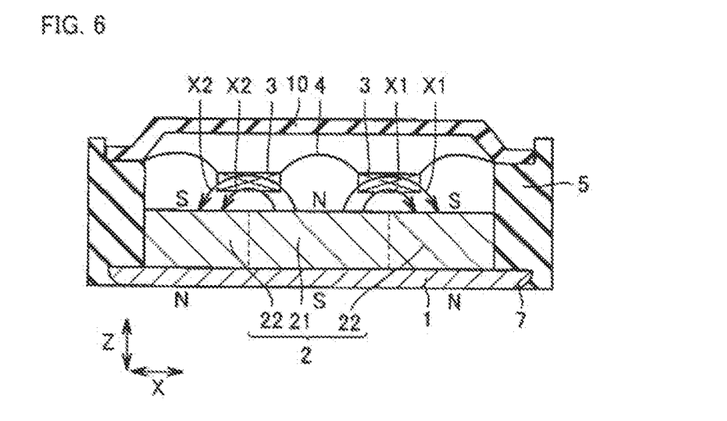
FIG. 6 is a schematic cross section of the speaker unit in the first embodiment.
Figure 7:
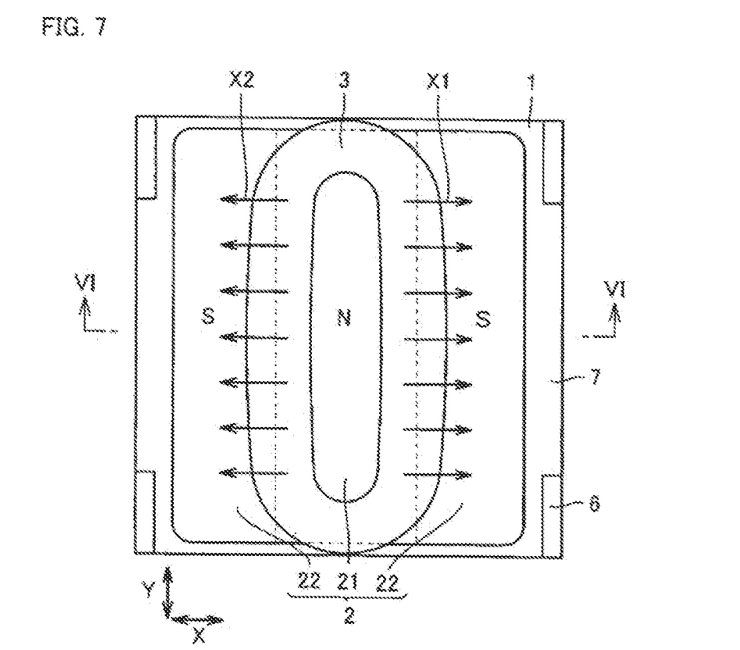
FIG. 7 is a schematic plan view of the speaker unit in the first embodiment.

Furthermore, while the foregoing description is of magnet member 2 made up of a plurality of magnetic bodies, magnet member 2 may be a single magnetic body with the upper surface having an N pole and an S pole. This configuration will be described in the following. FIG. 6 is a schematic cross section showing a configuration of the speaker unit in the present embodiment. FIG. 7 is a schematic plan view of the speaker unit shown in FIG. 6. FIG. 7 does not show the diaphragm and the frame cover for the sake of facilitating visual perception. A cross section along a line VI-VI in FIG.

7 is shown in FIG. 6. Referring to FIGS. 6 and 7, magnet member 2 is formed of a single magnetic body magnetized to have multiple poles. Like above-described magnet member 2 having a plurality of magnetic bodies 21, 22, magnetic fluxes X1, X2 are directed on the upper surface of magnet member 2.

Figure 8:
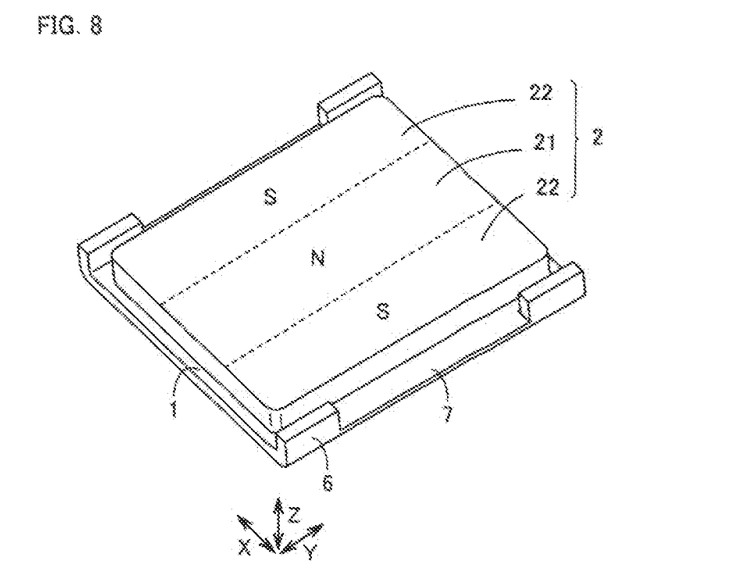
FIG. 8 is a schematic perspective view of the yoke and a magnet member of the speaker unit in the first embodiment.

FIG. 8 is a schematic perspective view of the yoke and the magnet member formed of a single magnetic body in the present embodiment. Referring to FIG. 8, magnet member 2 has, like above-described magnet member 2 having a plurality of magnetic bodies 21, 22, a central portion 21 and opposite end portions 22, and central portion 21 has its polarity opposite to that of opposite end portions 22. For example, central portion 21 has a polarity that the upper surface is an N pole and the lower surface is an S pole, and opposite end portions 22 each have a polarity that the upper surface is an S pole and the lower surface is an N pole. Since a single magnetic body which is magnetized to have multiple poles is used as magnet member 2, the number of components can be decreased and accordingly the production cost can be reduced, and the productivity including the production time for example can be improved, as compared with the case where a plurality of magnetic bodies are used.

Figure 9:
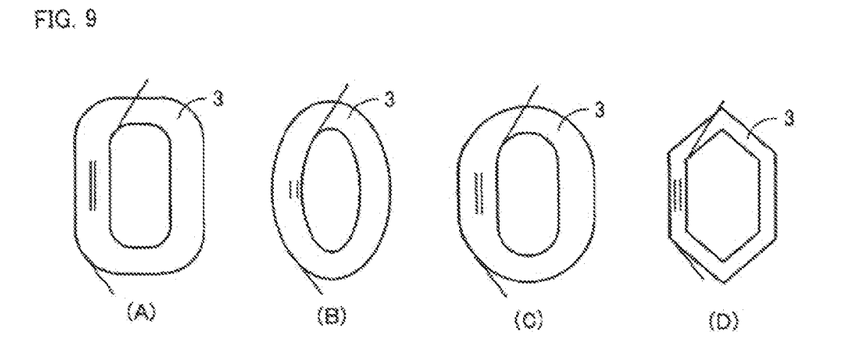
FIG. 9 is a schematic plan view of a coil of the speaker unit in the first embodiment.

Regarding the shape of coil 3, while the foregoing description is of coil 3 in the shape of a running track as seen in a plan view, coil 3 may be any of a rectangle coil, an elliptical coil, a running-track-shaped coil, and a polygonal coil. The degree of freedom in design can thus be enhanced. FIG. 9 (A) to (D) is a schematic plan view showing coil shapes. FIG. 9 (A) shows a rectangle coil which is rectangular as seen in a plan view, and has the longer sides and the shorter sides connected into the shape of a rectangle. In the case where this rectangle coil is used as coil 3, the length corresponding to a linear portion of the rectangle coil may be the length of the central portion of attachment 6. FIG. 9 (B) shows an elliptical coil which is formed in the shape of an ellipse having its major axis and minor axis as seen in a plan view. FIG. 9 (C) shows a running-track-shaped coil having linear portions as seen in a plan view. In the case where this running-track-shaped coil is used as coil 3, the length corresponding to a linear portion of the running-track-shaped coil may be the length of the central portion of attachment 6. FIG. 9 (D) shows a polygonal coil formed in the shape of a polygon made up of a plurality of linear portions as seen in a plan view.

An operation of the speaker unit in the present embodiment will now be described.

The above-described configuration allows magnetic fluxes generated from magnet member 2 to be converged to a gap where coil 3 is located, and a magnetic field is generated. As a current flows in coil 3, the current flowing in coil 3 and the magnetic field generated from magnet member 2 cause coil 3 to vibrate up and down based on the Fleming's left-hand rule. Thus, diaphragm 4 attached to coil 3 vibrates as well. Accordingly, the electrical signal (current) is converted into sound (vibration).

Next, the functions and effects of the speaker unit of the present embodiment will be described in comparison with another speaker unit.

As described above, in order to prevent a magnetic flux from magnet member 2 from leaking to the outside of the speaker unit, yoke 1 which covers the lower surface side of magnet member 2 may be provided. Yoke 1 is formed for example of a metal having a high magnetic permeability, and is therefore difficult to be processed into a complicated shape by bending or the like. Thus, yoke 1 and frame 5 may be provided separately and frame 5 may be formed for example of a resin so as to form frame 5 into a complicated shape.

Further, frame 5 may be formed of a resin so as to have a reduced weight. In the case where yoke 1 is thus provided separately from frame 5, it is necessary to secure yoke 1 to frame 5. It is therefore required to provide yoke 1 with attachment 6 for attaching the yoke to frame 5.

Figure 10:
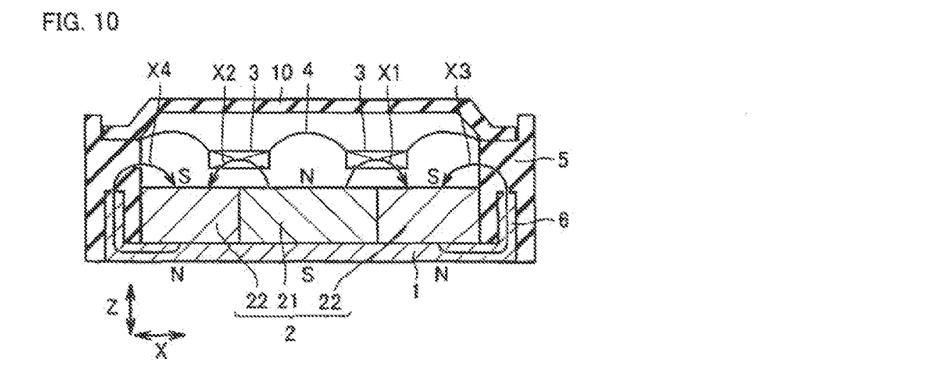
FIG. 10 is a schematic cross section of another speaker unit for comparison's sake.
Figure 11:
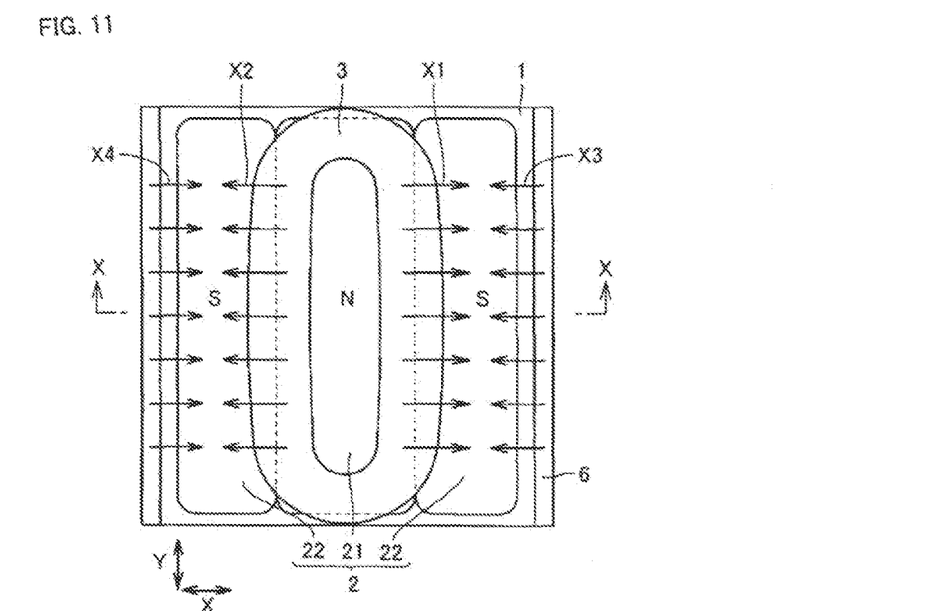
FIG. 11 is a schematic plan view of another speaker unit for comparison's sake.

FIGS. 10 and 11 are respectively a schematic cross section and a schematic plan view showing a configuration where attachments in the shape of protrusions to serve as attachments to the frame are provided respectively along the whole longer sides (the sides along the Y direction) of the yoke. FIG. 11 does not show the diaphragm and the frame cover for the sake of facilitating visual perception. A schematic cross section along a line X-X in FIG. 11 is shown in FIG. 10.

Referring to FIGS. 10 and 11, in the case where such attachments 6 in the shape of protrusions are provided to yoke 1, the number of loops of magnetic fluxes X3, X4 directed by attachments 6 along the paths connecting the upper surface and the lower surface of magnet member 2 increases. Thus, on the contrary, the number of loops of magnetic fluxes X1, X2 along the paths connecting an upper surface section and another upper surface section of magnet member 2 decreases, resulting in decrease in the number of magnetic fluxes passing through coil 3. Therefore, a magnetic efficiency loss is generated and the sound pressure decreases.

Figure 12:
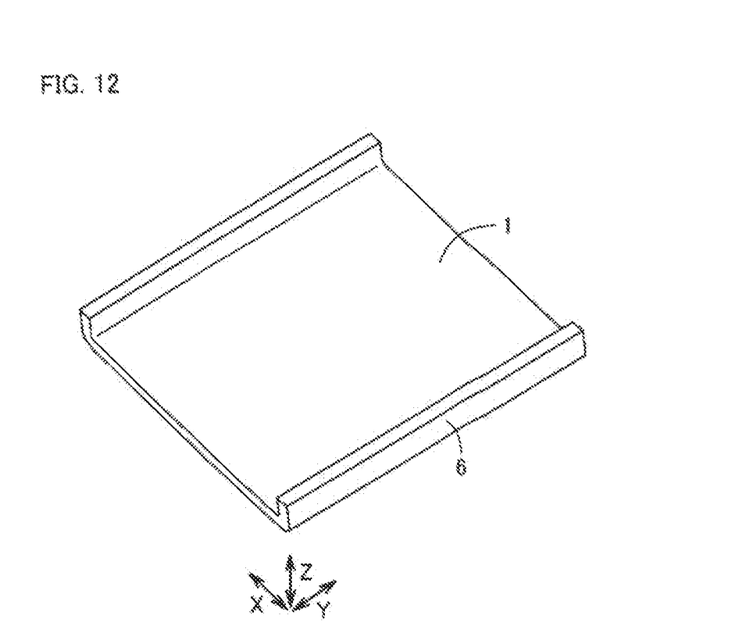
FIG. 12 is a schematic perspective view of a yoke of another speaker unit for comparison's sake.
Figure 13:
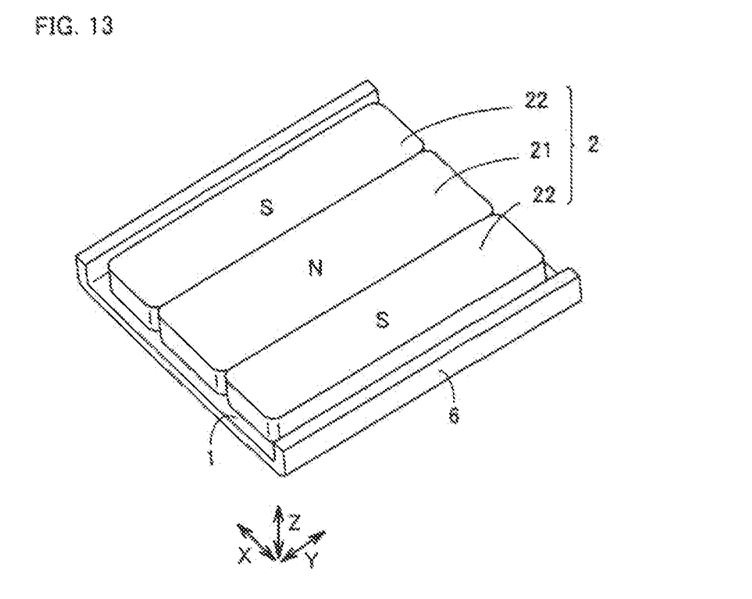
FIG. 13 is a schematic perspective view of the yoke and a magnet member of another speaker unit for comparison's sake.

FIG. 12 is a schematic perspective view of the yoke configured as shown in FIGS. 10 and 11. FIG. 13 is a schematic perspective view of the yoke and the magnet member configured as shown in FIGS. 10 and 11. Referring to FIGS. 12 and 13, the yoke of this configuration does not have recess 7 formed in a central portion of attachment 6. Therefore, loops of magnetic fluxes X3, X4 which are directed by attachments 6 along paths connecting the upper surface and the lower surface of magnet member 2 are formed along the whole of the longer sides (the sides along the Y direction) of the yoke. Further, magnet member 2 is magnetized so that the upper surface has the S pole, the N pole, and the S pole aligned in this order along the X direction and the lower surface has the N pole, the S pole, and the N pole aligned in this order along the X direction. Thus, the loops of magnetic fluxes X3, X4 which are directed by attachments 6 along the paths connecting the upper surface and the lower surface of magnet member 2 are formed.

In contrast, the speaker unit of the present embodiment is provided with recesses 7 which are each located in a central portion of attachment 6 of yoke 1. Therefore, in recesses 7, magnetic fluxes X3, X4 are not directed from respective lower surfaces of opposite end portions 22 of magnet member 2 through yoke 1 and attachments 6 to the upper surface of magnet member 2. Thus, in the regions adjacent to recesses 7 of magnet member 2, the number of magnetic fluxes on the upper surface of magnet member 2 can be increased. In this way, the number of magnetic fluxes passing through the coil can be increased and thereby the sound pressure can be improved.

If attachments 6 of yoke 1 do not have recesses 7, as shown in FIG. 9, magnetic fluxes X3, X4, which are directed by yoke 1 and attachments 6 from respective lower surfaces of opposite end portions 22 of magnet member 2, and magnetic fluxes X1, X2, which are directed from the N pole to the S poles on the upper surface of magnet member 2, cancel each other. Thus, magnetic fluxes X1 and X3 cancel each other and magnetic fluxes X2 and X4 cancel each other to cause a loss of the magnetic fluxes, resulting in reduction in magnetic efficiency in the direction along the upper surface of magnet member 2.

In contrast, the speaker unit of the present embodiment is provided with recesses 7 in central portions of attachments 6 of yoke 1. Accordingly, on the upper surface of magnet member 2, cancellation with each other of the magnetic flux in the vicinity of the boundary between the N pole and the S pole on the upper surface of magnet member 2 and the magnetic flux directed by magnet member 2 and yoke 1 can be suppressed, and the magnetic efficiency in the direction along the upper surface of magnet member 2 can be improved. In this way, the sound pressure can be improved.

In the case of the horizontal coil, magnetic fluxes X3, X4 between opposite end portions 22 of magnet member 2 and attachments 6 of yoke 1 do not function effectively for driving coil 3. Therefore, no attachments 6 of yoke 1 may be formed outside opposite end portions 22 of magnet member 2.

Recess 7 may have a length corresponding to the linear portion as seen in a plan view of the outline of coil 3. The horizontal coil is driven chiefly by the magnetic fluxes between the linear portion as seen in a plan view of the outline of coil 3 and the vicinity of the boundary between the N pole and the S pole on the upper surface of magnet member 2. Therefore, the length of recess 7 can be defined as corresponding to the linear portion as seen in a plan view of the outline of coil 3 to improve the magnetic efficiency. In this way, the sound pressure can be improved.

In this case, yoke 1 and frame 5 are assembled by forming attachments 6 in frame 5 by insert molding. Since attachments 6 are thus formed, the joint strength between yoke 1 and frame 5 can be improved.

In the case where the above-described rectangle coil is used as coil 3, the length corresponding to the linear portion as seen in a plan view of this rectangle coil may be the length of recess 7 of attachment 6. In the case where the above-described running-track-shaped coil is used as coil 3, the length corresponding to the linear portion as seen in a plan view of the running-track-shaped coil may be the length of recess 7 of attachment 6.

A magnetic flux between a round portion as seen in a plan view of the outline of coil 3 and attachment 6 of yoke 1 does not function effectively for driving coil 3. Therefore, attachment 6 of yoke 1 may be formed in the vicinity of the round portion as seen in a plan view of the outline of coil 3 to prevent decrease in magnetic efficiency.

Second Embodiment

First, a configuration of a portable information terminal in the present embodiment will be described.

Figure 14:
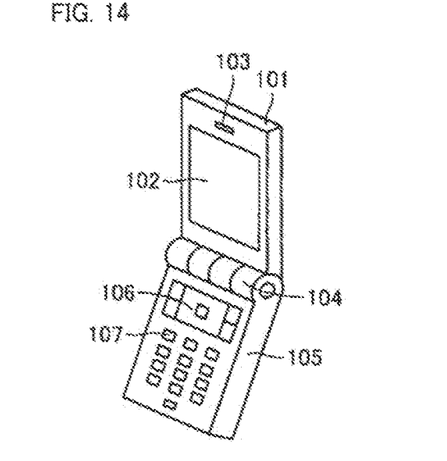
FIG. 14 is a schematic perspective view of a portable information terminal in a second embodiment.
Figure 15:
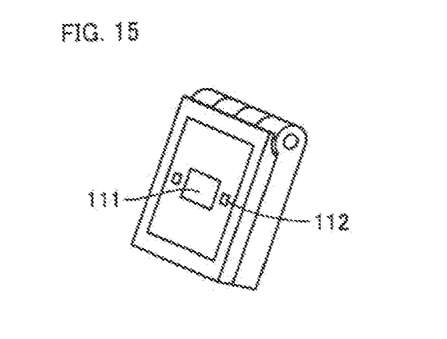
FIG. 15 is a schematic perspective view of the portable information terminal in the second embodiment.

FIGS. 14 and 15 are each a schematic perspective view of the portable information terminal in the second embodiment of the present invention. Referring to FIGS. 14 and 15, the portable information terminal in the present embodiment is a mobile phone that mainly includes an upper casing 101, a display unit 102, a sound emission hole 103, a hinge portion 104, a lower casing 105, an operation button 106, a numeric button 107, a display unit 111, a sound emission hole 112, and the speaker unit of the first embodiment (not shown).

Referring to FIG. 14, a surface of upper casing 101 is provided with display unit 102. On one end of the surface of upper casing 101, sound emission hole 103 is formed. On the other end of upper casing 101, hinge portion 104 is formed. On one end of lower casing 105, hinge portion 104 is formed. Hinge portion 104 couples upper casing 101 and lower casing 105 to each other so that they can be opened and closed. A surface of lower casing 105 has operation button 106 formed to the side of hinge portion 104. Numeric button 107 is formed opposite to hinge portion 104, with respect to operation button 106.

Referring to FIG. 15, the rear surface of upper casing 101 is provided with display unit 111. Sound emission hole 112 is formed to the side of display unit 111.

The speaker unit of the first embodiment (not shown) is provided in upper casing 101. With this speaker unit, the sound is emitted from the speaker unit mainly through sound emission holes 103 and 112 to the outside of the portable information terminal.

Next, the functions and effects of the portable information terminal in the present embodiment will be described.

The portable information terminal in the present embodiment includes the speaker unit of the above-described first embodiment, and therefore, even if the speaker unit has a reduced size and a reduced thickness, the magnetic efficiency can still be improved and the sound pressure can thus be increased.

Further, the portable information terminal in the present embodiment that achieves reduction in size and thickness can be a smaller-sized portable information terminal. Further, use of a space-saving speaker unit can improve the degree of freedom in design. Moreover, the sound pressure can be increased to clearly distinguish the voice and ringtone for example.

While the foregoing description of each embodiment is about a mobile phone as a portable information terminal, the portable information terminal is not limited to this and may be DSC, PDA, PC or the like.

It should be construed that the embodiments disclosed herein are by way of illustration in all respects, not by way of limitation. It is intended that the scope of the present invention is defined by claims, not by the above description, and encompasses all modifications and variations equivalent in meaning and scope to the claims.

INDUSTRIAL APPLICABILITY

The present invention is advantageously applicable particularly to speaker units and portable information terminals reduced in size and thickness.

DESCRIPTION OF THE REFERENCE SIGNS

1 yoke; 2 magnet member; 3 coil; 4 diaphragm; 5 frame; 6 attachment; 7 recess; 10 frame cover; 21 central portion; 22 opposite end portions; 101 upper casing; 102 display unit; 103, 112 sound emission hole; 104 hinge portion; 105 lower casing; 106 operation button; 107 numeric button; 111 display unit

The invention claimed is:

1. A speaker unit comprising:
   a yoke which has a rectangular outline as seen in a plan view;
   a magnet member which is placed on said yoke and magnetized so that an upper surface of the magnet member has an N pole and an S pole aligned in one direction;
   a coil which is placed above and spaced from said upper surface of said magnet member;
   a diaphragm which is attached to said coil; and
   a frame which supports said diaphragm, wherein
   said yoke includes an attachment which protrudes upward from an outer periphery of the yoke for attaching said yoke to said frame, and
   said attachment has a recess at least in a central portion of said attachment which crosses said one direction.

2. The speaker unit according to claim 1, wherein said attachment has a recess in a portion except for opposing ends of said attachment which crosses said one direction.

3. The speaker unit according to claim 1, wherein said magnet member is made up of a plurality of magnetic bodies including a first magnetic body having an upper surface magnetized to an N pole and a second magnetic body having an upper surface magnetized to an S pole, wherein the N and S poles are aligned laterally.

4. The speaker unit according to claim 1, wherein said magnet member is formed of a single magnetic body with an upper surface having an N pole and an S pole.

5. The speaker unit according to claim 1, wherein said coil is one of a rectangle coil, an elliptical coil, a running-track-shaped coil, and a polygonal coil.

6. A portable information terminal comprising a speaker unit as recited in claim 1.

* * * * *